(12) United States Patent
El Majihi et al.

(10) Patent No.: US 12,339,787 B2
(45) Date of Patent: Jun. 24, 2025

(54) METHOD AND SYSTEM FOR MANAGING A CACHE MEMORY

(71) Applicant: COMMISSARIAT A L'ENERGIE ATOMIQUE ET AUX ENERGIES ALTERNATIVES, Paris (FR)

(72) Inventors: Mustapha El Majihi, Grenoble (FR); Amine Jaamoum, Grenoble (FR); Billal Ighilahriz, Grenoble (FR); Thomas Hiscock, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 235 days.

(21) Appl. No.: 18/055,202

(22) Filed: Nov. 14, 2022

(65) Prior Publication Data

US 2023/0176982 A1    Jun. 8, 2023

(30) Foreign Application Priority Data

Nov. 15, 2021    (FR) ..................................... 21 12076

(51) Int. Cl.
*G06F 12/14*    (2006.01)
(52) U.S. Cl.
CPC ...... *G06F 12/1425* (2013.01); *G06F 12/1483* (2013.01); *G06F 2212/1052* (2013.01)
(58) Field of Classification Search
CPC ............ G06F 12/1424; G06F 12/1483; G06F 2212/1052
USPC ......................................................... 711/163
See application file for complete search history.

(56) References Cited

U.S. PATENT DOCUMENTS

| | | | |
|---|---|---|---|
| 8,671,261 B2 * | 3/2014 | Colombo | G06F 12/0223 |
| | | | 711/170 |
| 9,645,927 B2 | 5/2017 | Palfer-Sollier | |
| 2011/0191848 A1 * | 8/2011 | Zorn | G06F 21/56 |
| | | | 717/148 |

(Continued)

FOREIGN PATENT DOCUMENTS

| EP | 3 671 470 A1 | 6/2020 |
|---|---|---|
| KR | 10-2018-0114774 A | 10/2018 |

OTHER PUBLICATIONS

Wikipedia Executable space protection (Year: 2024).*

(Continued)

*Primary Examiner* — Yaima Rigol
(74) *Attorney, Agent, or Firm* — Oblon, McClelland, Maier & Neustadt, L.L.P.

(57) ABSTRACT

A management system for managing a cache memory including a randomization module configured for generating a random value for each process of accessing the cache memory, and for transforming addresses of the cache memory with said random value into randomized addresses, a history table configured to store therein on each line an identification pair associating a random value corresponding to an access process, with an identifier of the corresponding access process, so forming identification pairs that are operative to dynamically partition the cache memory while registering the access to the cache memory, and a state machine configured to manage each process of accessing the cache memory according to the identification pairs stored in the history table.

14 Claims, 5 Drawing Sheets

(56) References Cited

U.S. PATENT DOCUMENTS

| | | | |
|---|---|---|---|
| 2012/0331309 A1* | 12/2012 | Scott | G06F 21/755 |
| | | | 713/194 |
| 2015/0370709 A1 | 12/2015 | Palper-Sollier | |
| 2016/0170889 A1* | 6/2016 | Lee | G06F 12/0868 |
| | | | 711/118 |
| 2018/0046808 A1* | 2/2018 | Cammarota | G06F 21/57 |
| 2020/0192813 A1 | 6/2020 | Hiscock et al. | |
| 2020/0341901 A1* | 10/2020 | Sandberg | H04L 9/003 |
| 2022/0200783 A1* | 6/2022 | Unterluggauer | G06F 12/121 |

OTHER PUBLICATIONS

Wikipedia Address Space Layout Randomization (Year: 2024).*
French Preliminary Search Report issued Jun. 22, 2022, in French Application 21 12076, filed on Nov. 15, 2021 (with English Translation of Categories of cited documents and Written Opinion), 9 pages.
Wang et al. "New Cache Designs for Thwarting Software Cache-based Side Channel Attacks," ACM SIGARCH Computer Architecture News vol. 35 Issue No. 2, 2007, 12 pages.

* cited by examiner

METHOD AND SYSTEM FOR MANAGING A CACHE MEMORY

TECHNICAL FIELD

The present invention generally relates to the field of managing cache memories and, more particularly, the provision of security for cache memories against side channel attacks. It finds application in the field of all electronic devices comprising cache memories.

STATE OF THE PRIOR ART

Cache memories are very fast but have a small storage capacity and serve for storing temporary data. A cache memory thus enables a processor to execute a process while reducing its time of access to the data initially stored in a main memory. The term 'process' designates both a program or software application run by the processor and capable of reading or writing in the cache memory.

The processor always first of all seeks to access a data item or instruction in the cache memory. If the data item sought is not found in the cache memory, a cache fault (referred to as cache miss) is triggered in order for the data item to be loaded from the main memory, then kept in the cache memory for future access. In case of success (referred to as cache hit), the main memory is not accessed and therefore the access time is much faster.

These variations in access time between cache hits and cache misses inherent in these memories have been exploited by attackers to develop attacks known by the term "side channel attacks". These attacks make it possible to reveal secret information processed by an executed process or to modify the operation of the process to get around security measures.

Side channel attacks aimed at the cache memory exploit leakages of information on the addresses consulted based on a variety of measurable information such as the time of access to the memory or the performance counters (e.g. the number of cache hits and cache misses) These microarchitectural attacks appeared very soon after physical attacks on side channels. They may be used to retrieve secret information, for example, the secret key used by encryption algorithms.

A classic means of side channel attack on cache memory involves a victim process and an attacking process. It is generally composed of 'profiling' and 'exploitation' phases. In the 'profiling' phase, the attacker identifies what are referred to as target addresses, which are addresses whose access models can disclose secret information on the victim's program. These target addresses may be identified by analyzing the victim's program manually or with automatic tools. In the exploitation phase, the attacker observes the victim's accesses to the target addresses and deduces therefrom the value of the secret information.

There are currently a set of techniques used to attack cache memories. These attacks may be classified into three categories.

The first category, referred to as temporal attack, is based on time. In a temporal attack the attacker measures the total execution time of the operation carried out by the victim process. The grounds for this attack is that the execution time varies according to the execution paths traversed or the hit/miss caches, which is often due to secret information. These temporal attacks require a high number of samples in order to reduce the noise introduced by the operating system.

An example of a temporal attack is what is referred to as the 'Evict+Time' attack in which the attacker seeks to know whether the time of execution by the victim is longer in the absence of certain Sets from the cache memory. The attacker makes the attack in three steps. The first step consists of setting off the victim's process. The second step (referred to as the Evict step) consists of filling a specific cache set with data from the attacker. The third step (referred to as the Time step) consists of again measuring the victim's execution time. After the first execution, the data used by the victim are placed in cache memory. If the attacker has evicted one or more lines from the cache memory, the execution time of the victim process will be slower. On the other hand, if the evicted lines are not useful, the second execution will be faster. This technique has enabled the entire key used by the AES to be extracted.

The second category of attack is based on accesses. In this type of attack, the attacker monitors the patterns of addresses accessed in the cache memory to determine whether a specific instruction or data item has been used by the victim process. This information is obtained by measuring the access time. If the victim has made access thereto, the attacker will observe a cache hit, otherwise it will observe a cache miss. A common access-based attack on the AES consists of monitoring the inputs to the search table on executing the AES.

An example of an access-based attack is what is referred to as the 'Prime+Probe' attack. The attacker first of all fills one or more sets of cache memory with its own data and then determines which of them have been replaced after having executed the victim process. As a matter of fact, the attack is founded on three steps. At the first step (referred to as Prime), the attacker loads one or more sets of the cache memory with its own data. At the second step, the attacker waits for a certain time for the victim process to execute and use the cache memory. Lastly, at the third step (referred to as Probe), the attacker measures the access time to the same and that that have been loaded into the cache memory during the first step (Prime). If the attacker measures a greater latency in loading its cache lines, it means that the victim process has loaded data corresponding to the same cache lines used by the attacking process. Instead of measuring the overall execution time in the 'Evict+Time' attack, here the attacker only measures its own execution duration, which is much more accurate and thus makes the attack more effective. On the other hand, the mapping between virtual and physical addresses makes the attack complicated, especially for physically indexed cache memories.

The third category of attack is based on traces. These attacks are much more powerful since the attacker exploits a specific line of the cache memory. In this type of attack, the attacking process and the victim process share a same memory zone. The attacker obtains hit/miss traces relative to a shared entry in the cache memory by using a maintenance instruction of the cache memory to get rid of the line concerned (for example, the Clflush instruction in x86 architectures). The socket information is retrieved based on the cache hit and cache miss sequence.

An example of an attack based on traces is what is referred to as the 'Flush+Reload' attack. This attack aims to exploit the difference in access time to a line according to its presence or absence in the cache memory. The vulnerability exploited by this attack is for example, the absence of restriction for the "Cflush" instruction on architectures of the INTEL x86 processor. This enables an attacker in the processor core competing with the victim's processor core to eliminate a memory line from the cache memory. This weakness exposes the last level L3 of the cache memory which is shared between all the cores of the processor. This attack is also based on three steps. In a first step (referred to as Flush) one or more data items are evicted from one or more lines of the cache memory using a maintenance instruction. At the second step, the attacker waits for a certain time for the victim process to execute and use the cache memory. Lastly, at the third step (referred to as Reload), the attacker reloads the evicted data or data item while measuring the access time knowing that it would beforehand have predefined a threshold to differentiate between the miss time and the hit time. This threshold enables the attacker to know whether the victim has accessed the target line or not.

Variants of the attacks described above also exist. Most of the attacks are based on the physical sharing of cache between processors or cores. By repeatedly reading or writing in the shared cache, the attacking process is able to learn the victim's memory scheme. Thus, it is through treating the problem at the architectural level that an optimal solution can be achieved.

The most intuitive defense against attacks on cache memories is partitioning. The basic concept is to separate the various processes by attributing to them distinct regions in the cache memory, thereby preventing instances of interference between a victim process and an attack process.

Hardware partitioning techniques exist which are referred to as static and consist of creating cache partitions at hardware level. Moreover, there are also software partitioning techniques based on the correlation of the cache.

These hardware and software partitioning techniques are effective for countering side channel attacks but with a penalty in terms of performance deterioration. This depends on the number of partitions and may go as far as a 30% drop in performance.

There are other methods of protection that consist in obscuring the access to the cache memory by a randomization technique which enables full sharing of the cache which does not therefore affect its performance.

An example of randomization is described in the applicant's patent application EP3671470 which uses slight permutation based on XOR gates to break the direct link between addresses and their locations in the cache memory. More particularly, the architecture according to that prior art application provides a form of dynamic positioning by associating a different key value with each process to form its addressing in the cache memory. The key values are stored in a history table so as not to deteriorate the performance of the cache memory. This method provides good protection while having a low impact on performance and a low storage penalty. However, the architecture may be vulnerable to certain cache timing attacks and especially the 'Flush+Reload' attack. Furthermore, the method may present a problem of memory coherence due to the fact that certain untracked lines of cache may be abandoned without 'writeback' occurring in the main memory.

The present invention is directed to providing a method and a system for managing a cache memory mitigating the aforementioned drawbacks and providing effective countermeasures against side channel attacks while minimizing the impact on the performance of the cache memory.

PRESENTATION OF THE INVENTION

The present invention is defined by a method for managing a cache memory provided to equip an electronic device comprising a processor and a main memory, said method comprising the following steps:
   generating a random value for each process of accessing the cache memory,
   transforming the addresses of the cache memory by means of said random value into corresponding addresses, said randomized addresses being configured for indexing the cache memory,
   associating each random value corresponding to an access process, with an identifier of said access process, so forming pairs of identifications that are operative to dynamically partition the cache memory while registering the access to said cache memory,
   storing each identification pair composed of a random value and of a corresponding identifier in a history table, and
   managing each process of accessing the cache memory according to said identification pairs stored in said history table.

This method makes it possible to strengthen the security of the cache memory while maintaining very good performance. As a matter of fact, the fact that the identifier is added to the history table and not to the cache memory makes it possible to minimize the equipment cost and the verification time.

According to a first embodiment, the method comprises the following steps:
   receiving a current request comprising the current identifier of a current access process and a current access address to the cache memory,
   going through the lines of the history table to verify whether an identifier is present in the history table that matches the current identifier of the current access process,
   in the positive, calculating the randomized address of said current access address using the random value associated with the identifier found in the history table corresponding to the current identifier,
   in the negative, triggering a cache fault giving rise to the generation of a current random value configured to be associated with the identifier of said current access process to form a current identification pair, and
   storing said current identification pair on a free line of the history table.

This makes it possible establish a good balance between security and performance.

According to a second embodiment, the method comprises the step of storing, in a field of the cache memory, referred to as permission field, a permission vector of dimension equal to the number of lines of the history table, each component of said permission vector corresponding to one and only one line of said history table and whose value indicates legitimacy or non-legitimacy of the access process referenced by its identifier stored in said line.

Thus, the ID process field in the cache memory makes it possible to correct the problem of memory aliasing and data sharing.

Advantageously, the method comprises the following steps:
   going through the lines of the history table sequentially to calculate, at each current line, the randomized address indexing the cache memory based on the random value stored in said current line and on the address indicated in the request, and
   verifying the validity (i.e. the valid bit and the tag) of the current line of the cache memory defined by the corresponding randomized address.

Advantageously, the method comprises the step of triggering a cache fault if the end of the history table is reached while validating no line of the cache memory.

Advantageously, the method comprises the following steps:
verifying the match between the current identifier and the identifier belonging to the pair relative to the current line (i.e. the current iteration), if the line of the cache memory is validated (i.e. valid bit and tag validated).
verifying whether the current identifier is present in the history table in case of non-match between the current identifier and said identifier relative to said current line,
noting the position of an identifier stored in the history table if that identifier is equal to the current identifier,
triggering a cache hit if the legitimacy bit of the permission vector at a position corresponding to said noted position of said identifier stored in the history table, is valid,
simulating the triggering of a cache fault if the legitimacy bit at said position of the permission vector is not valid.

Thus, a cache hit is triggered if the access process accesses a shared data item present in the cache memory and to which it has legitimacy of access. On the other hand, a cache fault is triggered if the access process accesses a shared data item present in the cache memory but to which it does not have legitimacy. This makes it possible to prohibit the access tracking that an attacking process can carry out on a victim process. Furthermore, this enables sharing of the same data item by several processes that are already registered in the history table by their respective identifier and random values.

Advantageously, if a cache fault is triggered, the method comprises the step of withdrawing the legitimacy of a process of accessing a shared data item, without deleting said shared data item from the cache memory if said access process requires eviction of said shared data item from the cache memory or if it leaves the history table.

This keeps the shared data item in the cache memory such that the other access process (or processes) sharing the same data item can still access that data item.

Advantageously, the method comprises the step of writing back said shared data item in the main memory if it has been modified and a last access process having legitimacy to said shared data item evicts it from the cache memory or leaves the history table.

In this way, the management of memory coherency is solved.

The invention also relates to a system for managing a cache memory configured to equip an electronic device comprising a processor and a main memory, comprising:
a randomization module configured for generating a random value for each process of accessing the cache memory, and for transforming addresses of the cache memory by means of said random value into corresponding addresses, referred to as randomized addresses configured for indexing the cache memory,
a history table composed of a determined number of lines configured to store therein on each line an identification pair associating a random value corresponding to an access process, with an identifier of said corresponding access process, so forming identification pairs that are operative to dynamically partition the cache memory while registering the access to said cache memory, and
a state machine configured for accessing the history table and for managing each process of accessing the cache memory according to said identification pairs stored in said history table.

Advantageously, the system comprises:
a set of registers configured for receiving a current request comprising the current identifier of a current access process and a current access address to the cache memory, and
a state machine configured for:
going through the lines of the history table to verify whether an identifier is present in the history table that matches the current identifier of the current access process,
in the positive, calculating the randomized address of said current access address using the random value associated with the identifier found in the history table corresponding to the current identifier,
in the negative, triggering a cache fault giving rise to the generation of a current random value configured to be associated with the identifier of said current access process to form a current identification pair, and
storing said current identification pair on a free line of the history table.

It will be noted that there are several types of cache memory such as direct mapping cache memories, associative cache memories, and set-associative cache memories. By way of non-limiting example, the cache memory is divided into several rows each of which comprises a data field, a line tag, a valid bit, and a modification bit.

Advantageously, the cache memory further comprises a permission field of the access process configured to store therein a permission vector of dimension equal to the number of lines of the history table, each component of said permission vector corresponding to one and only one line of said history table and whose value indicates legitimacy or non-legitimacy of the access process referenced by its identifier stored in said line.

Advantageously, the state machine is configured for:
going through the lines of the history table sequentially to calculate, at each current line, the randomized address indexing the cache memory based on the random value stored in said current line and on the address indicated in the request, and
verifying the validity (i.e. the valid bit and the tag) of the current line of the cache memory defined by the corresponding randomized address.

Advantageously, the state machine is configured for:
verifying the matching between the current identifier and the identifier belonging to the pair relative to the current line (i.e. the current iteration), if the line of the cache memory is validated (i.e. valid bit and tag validated).
verifying whether the current identifier is present in the history table in case of non-match between the current identifier and said identifier relative to said current line,
noting the position of an identifier stored in the history table if that identifier is equal to the current identifier,
triggering a cache hit if the legitimacy bit of the permission vector at a position corresponding to said noted position of said identifier stored in the history table, is valid,
simulating the triggering of a cache fault (cache miss) if the legitimacy bit at said position of the permission vector is not valid.

The invention also relates to an electronic device comprising a main memory, and a cache memory, further comprising a system for managing the cache memory according to any one of the above features.

DESCRIPTION OF THE EMBODIMENTS

Figure 1:
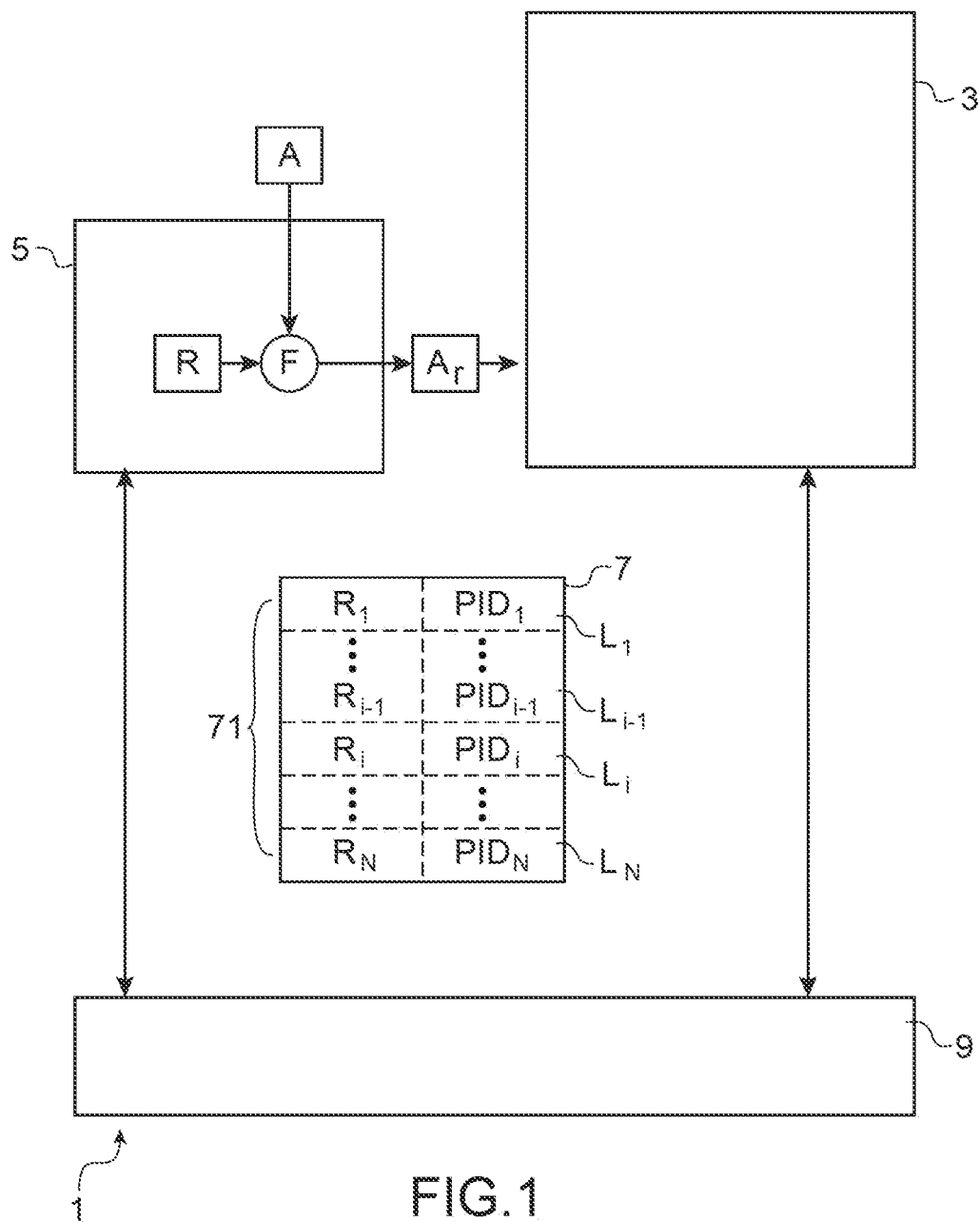
FIG. 1 is a diagram of a system for managing a cache memory, according to an embodiment of the invention.

FIG. 1 is a diagram of a system for managing a cache memory, according to an embodiment of the invention. This figure also diagrammatically illustrates a method for managing a cache memory, according to an embodiment of the invention.

The system 1 for managing a cache memory 3 is configured to equip an electronic device comprising a processor and a main memory. This management system 1 comprises a randomization module 5, a history table 7 and a state machine 9.

The randomization module 5 is configured for generating a random value R for each process of accessing the cache memory 3. Furthermore, it is configured for transforming addresses of the cache memory 3 by means of the random value R into corresponding addresses, referred to as randomized (or transformed) addresses $A_r$, which are provided to index the cache memory 3. By way of example, the randomization is carried out by means of a non-reversible operation F between the initial address A and the random value R associated with the access process.

Thus, the addressing of the cache memory 3 prior to the randomization is different from that after that randomization. This makes it difficult to implement side channel attacks which attempt to obtain secret information based on the observation of the accesses by a process to that cache memory 3.

The history table 7 is composed of a determined number N of indexed lines $L_1, \ldots, L_N$ 71 and is configured for storing the random values $R_1, \ldots, R_N$ corresponding to the access processes as well as identifiers $PID_1, \ldots, PID_N$ of those access processes. More particularly, each indexed line $L_i$ comprises an identification pair $(R_i, PID_i)$ associating a random value $R_i$ with a corresponding identifier $PID_i$. The identification pairs stored in the history table are operative to dynamically partition the cache memory while registering the accesses to the cache memory.

As a matter of fact, the storage of the random values $R_i$ in the history table 7 makes it possible to store the memory accesses of an access process after a change of context. This makes it possible to optimize performance since it is not necessary to empty the cache memory 3 at the time of a change of context.

Furthermore, the storage of the identifiers $PID_i$ in the history table 7 in association with the corresponding random values $R_i$, enables dynamic partitioning of the cache memory while minimizing the hardware cost of that storage and by speeding up the verification time of the access process.

It will be noted that the association of the random value $R_i$ with a corresponding identifier $PID_i$ adds a second layer of dynamic isolation. That being the case, when a victim process is run, it will have the same random value for its accesses to the cache memory 3. On the other hand, the random value of an attacking process will be changed and therefore will be unable to track the accesses of the victim process. This is makes it possible to counter the cache timing attacks of 'Flush+Reload' type.

Furthermore, this makes it possible not to abandon any line of the cache memory 3 without there being prior write back into the main memory thus re-establishing the consistency between the cache memory 3 and the main memory.

The management of the access processes is carried out by the state machine 9. As a matter of fact, a state machine 9 is configured for accessing the history table 7 and managing each process of accessing the cache memory according to identification pairs (i.e. identifiers $PID_i$ and corresponding random values $R_i$) stored in said history table. Thus, for the future accesses of a process to the cache memory 3, the state machine 9 will go through the history table 7 to see whether its identifier is already present in the table 7 in order to manage the random value being created or not created.

This management system 1 thus makes it possible to strengthen the security of the cache memory 3 while maintaining very good performance.

Figure 2:
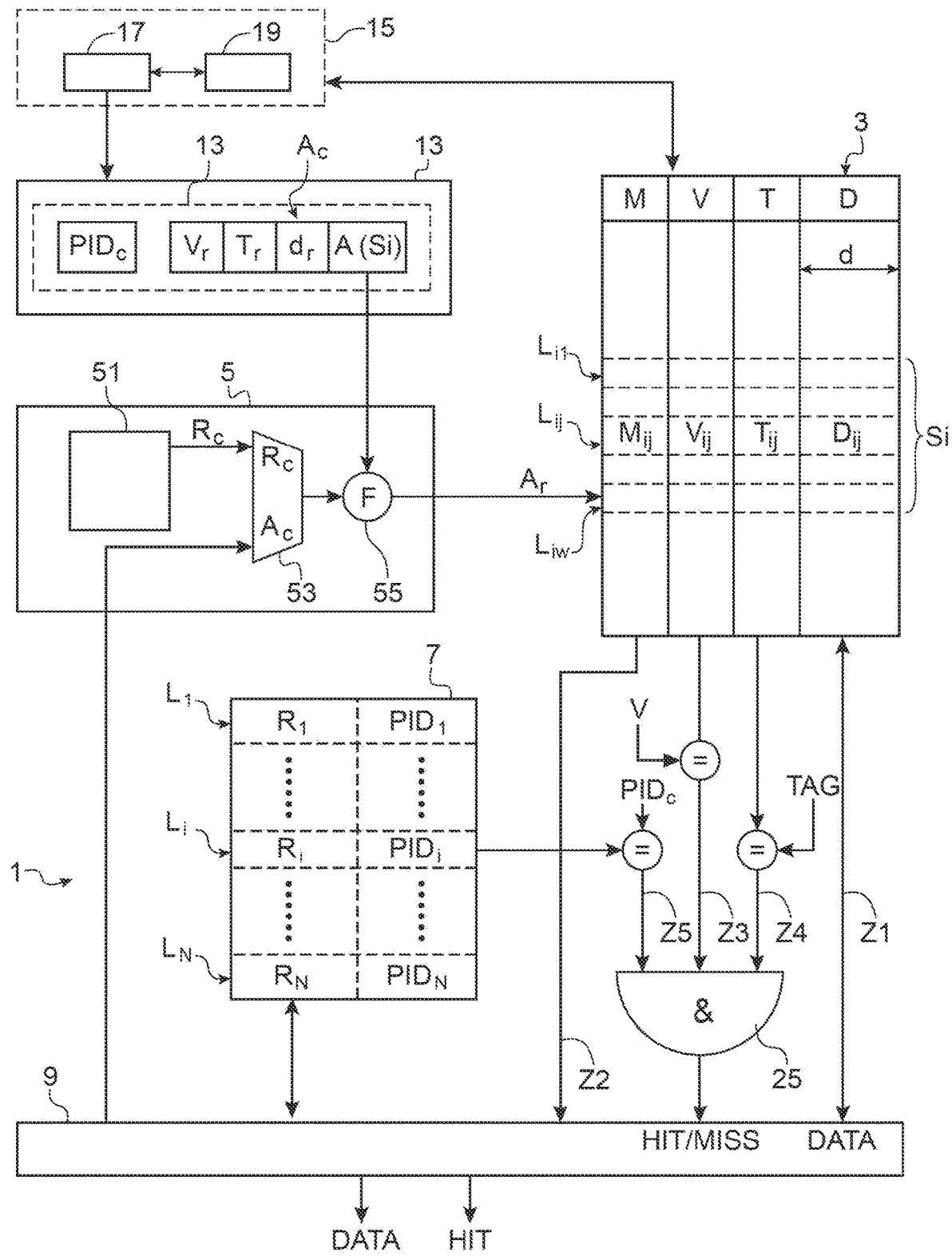
FIG. 2 is a diagram of an implementation of a system for managing a cache memory, according to an embodiment of the invention.

FIG. 2 is a diagram of an implementation of a system for managing a cache memory, according to an embodiment of the invention.

The system 1 for managing the cache memory 3 comprises a set of registers 13, a randomization module 5, a history table 7 and a state machine 9. This management system 1 is configured to equip an electronic device 15 comprising a processor 17 and a main memory 19.

The cache memory 3 may for example be of associative, or set-associative, or direct mapping, or other type. In general terms, the cache memory 3 comprises an information recording medium subdivided into several lines $L_{11}, \ldots, L_{i1}, \ldots, L_{iw}, \ldots, L_{nw}$ of fixed length. By way of example, and without being exhaustive, each line $L_{ij}$ comprises a data field $D_{ij}$, a line tag $T_{ij}$ called 'Tag', a valid bit $V_{ij}$, and a modification bit $M_{ij}$ called 'dirty bit'.

For example, in the case of an associative cache memory 3, the lines are grouped together into distinct sets referred to as 'Sets' Si. Each Set Si contains a same number W of lines $L_{ij}$. The index 'i' identifies a Set Si among the other Sets of lines which the cache memory 3 comprises and the index 'j' identifies a particular line j of the Set Si. The position of each Set Si in the cache memory 3 is indicated by an address A=A(Si) called 'line set address' or 'Set address'.

The data field $D_{ij}$ is divided into a determined number d of words (by e.g. d=4) of fixed length. It will be noted that the lengths of a word, of a field and of a line are expressed by the number of bits that composes them. For example, if the length of a word is equal to 32 bits, a data field of 4 words is 128 bits.

The Tag $T_{ij}$ contains a value which makes it possible to select the line $L_{ij}$ which contains the word sought from among the W lines $L_{ij}$ of the Set Si.

The valid bit $V_{ij}$ of a line is an information bit which makes it possible to mark that line $L_{ij}$ as being valid "1" or invalid "0". A line marked as invalid must be treated as if it did not contain any word. Thus, a line $L_{ij}$ marked as invalid is to be erased and replaced by another line loaded from the main memory 19. The modification bit (i.e. dirty bit) $M_{ij}$ relative to a line $L_{ij}$ is an information bit which makes it possible to mark that line $L_{ij}$ as having been modified. When a line $L_{ij}$ is marked as modified, and according to the type of the cache memory 3, the field $D_{ij}$ that it contains is taken into account before, for example, that line is marked as invalid. More particularly, for a cache memory 3 of 'write back' type, the data item is re-written into the main memory solely when that line of the cache memory 3 is overloaded or evicted. On the other hand, for a cache memory 3 of 'write-through' type, the data item is immediately written in the main memory.

The set of registers 13 is configured to receive, from the processor 17, a current request 21 comprising the current identifier $PID_c$ of a current access process and a current access address $A_c$ to the cache memory 3.

More particularly, the current access address $A_c$ comprises an address A(Si) of a Set Si, an index $d_r$, and a Tag $T_r$. The address A(Si) of a Set Si of the cache memory 3 is the address that may contain the word to read. The index $d_r$ makes it possible to identify the position of the word to read in the field $D_{ij}$ of the W lines $L_{i1}, \ldots, L_{iw}$ of the Set Si identified by the address A(Si). The Tag $T_r$ makes it possible to select, from among the Set of the W lines $L_{i1}, \ldots, L_{iw}$ of the Set Si corresponding to the address A(Si), the line $L_{ik}$ which contains the word to read if that line exists.

It will be noted that a request to write a word in the cache memory 3 is practically identical to the read request but in addition it comprises a numerical value Vr containing the new value of the word to record in the cache memory 3.

Thus, the set of registers 13 comprises registers in which are recorded the various data items contained in the write or read request 21.

The randomization module 5 comprises a random (more accurately, pseudo-random) value generator 51, a multiplexer module 53 and a randomization operator 55.

The generator 51 is configured to generate pseudo-random values R (referred to as random values), such that a current random value $R_c$ is associated with each current access process.

The multiplexer module 53 is configured to select either the use of a random value already stored in the history table or a new current random value $R_c$ generated by the generator 51.

The randomization operator 55 is configured to perform a randomization operation F between the current address $A_c$ and the current random value $R_c$ associated with the access process. Thus, the current address $A_c$ of the cache memory 3 is transformed into a corresponding randomized address Ar configured to index the cache memory: $A_r=F(A_c, R_c)$. By way of example, the randomization operation F is a logic operation of XOR type.

This randomization makes it possible to mix the lines of the cache memory 3 such that an attacker cannot know which line has been accessed and therefore cannot track the memory access of its victim.

Furthermore, in order to store the memory accesses of an access process after a change of context, these random variables are stored in the history table 7. As indicated previously, the history table 7 is composed of a determined number N of lines which are sequentially indexed. Each line $L_i$ comprises an identification pair composed of a random value $R_i$ and of the identifier $PID_i$ of a corresponding access process. It will be noted that a line $L_i$ of the history table 7 is reference by a single index (here, the index 'i') designating the line number while a line $L_{ij}$ of the cache memory 3 is referenced by two indexes, the first 'i' identifying the Set Si and the second 'j' identifying the number of the line in that Set Si.

The association of the random value $R_i$ with a corresponding identifier $PID_i$ has several advantageous functions. A first is the fact that a legitimate process will always have the same random value for its accesses to the cache memory 3 while an attacking process will be changed and will thus be unable to track the accesses by the victim process. A second function is the re-establishment of consistency between the cache memory 3 and the main memory 19 since no line of the cache memory 3 will have been abandoned prior to it being written back into the main memory 19. A third function is dynamic randomization of the cache memory at lower equipment and temporal costs.

The state machine 9 is connected to the randomization module 5, to the cache memory 3, and to the history table 7. For example, the coupling between the state machine 9 and the cache memory 3 is achieved by means of several signals or links comprising a first link Z1 which goes in both directions between the data field $D_{ij}$ and the state machine 9, and a second signal Z2 which goes directly from the modification bit $M_{ij}$ to the state machine 9 and two validity/invalidity signals Z3 and Z4 which go indirectly via an 'AND' logic gate 25 from the valid and tag bits $V_{ij}$, $T_{ij}$ respectively to the state machine 9. Furthermore, the logic gate 25 also comprises another input Z5 corresponding to a validity/invalidity signal of the identifier PIDi stored in the history table 7.

The state machine 9 is configured to manage the history table 7 in relation with the cache memory 3. More particularly, the state machine 9 is configured to go through the lines of the history table 7 to verify whether the current identifier $PID_c$ of the current access process is already present in that history table 7. That is to say, the state machine 9 verifies whether there is an identifier PIDi present in the history table 7 which matches the current identifier PIDc of the current access process.

If the current identifier $PID_c$ is already present in the history table 7 (i.e. if an identifier PIDi is found in the history table matching the current identifier PIDc) and if the valid and tag bits are valid, a success cache (i.e. a cache hit) is triggered by the state machine 9. Thus, the random value R associated with that identifier PIDi found in the history table is used to calculated the randomized address Ar of the current access address $A_c$. The resulting randomized address Ar then enables the processor 17 to access the cache memory 3. The triggering of a cache hit is carried out solely if the three inputs Z3, Z4, Z5 of the logic gate 25 are valid.

In the negative, i.e. if at least one of the three inputs Z3, Z4, Z5 of the logic gate 25 is invalid, a cache fault (cache miss) is triggered by the state machine 9. This cache fault gives rise to the generation of a current random value $R_c$ provided to be associated with the identifier of the current access process to form a current identification pair. This current identification pair is stored on a free indexing line of the history table. Furthermore, the current random value $R_c$ generated is used to randomize the current access address $A_c$.

Figure 3:
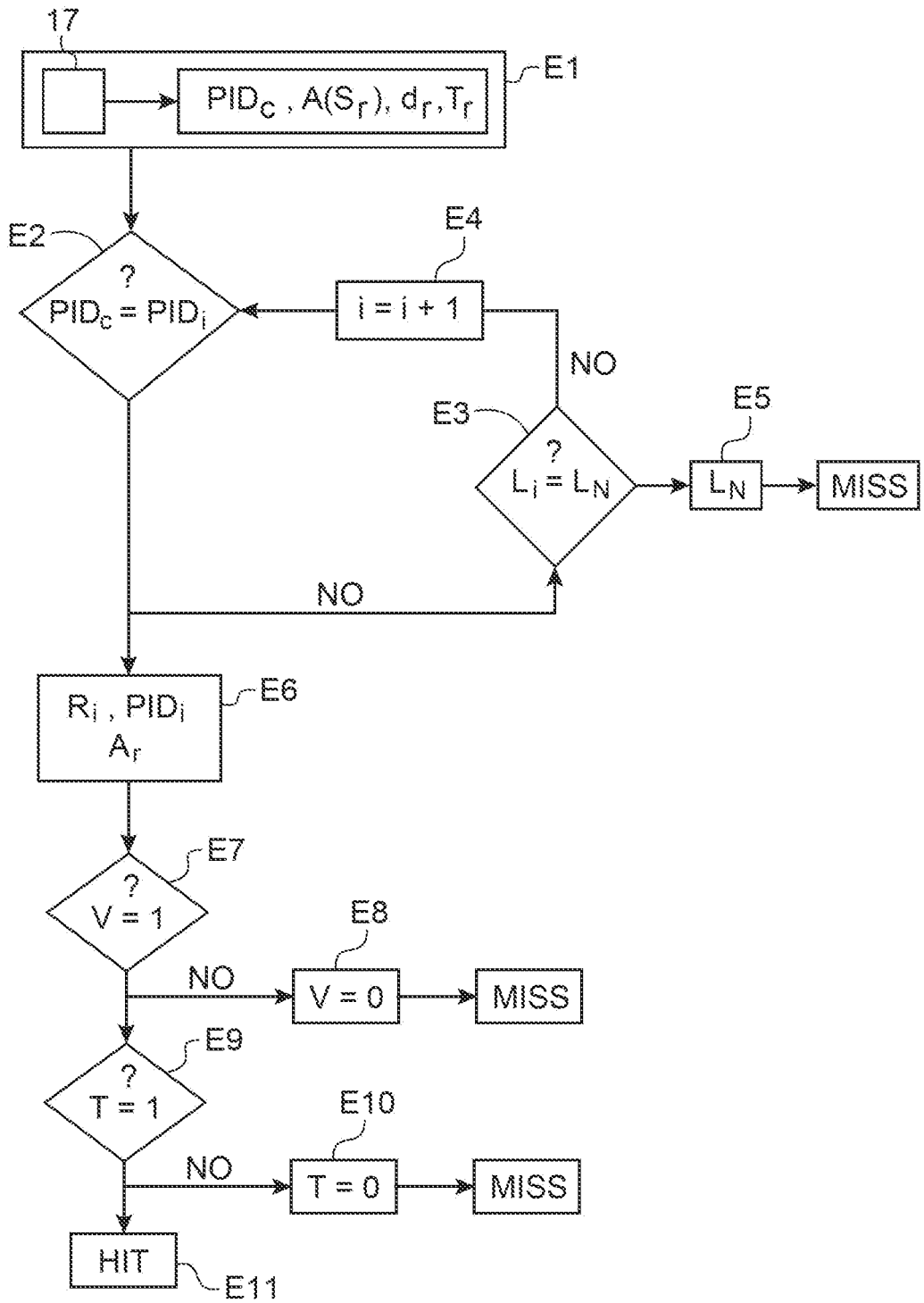
FIG. 3 is a diagram of a method for managing a cache memory, according to the system implemented in FIG. 2.

FIG. 3 is a diagram of a method of managing a cache memory, according to the system implemented in FIG. 2.

Assuming that a given current process X is executed in the processor 17 and wishes to perform an access to the main memory 19, for example to read a data item.

At step E1, the processor 17 produces a current request 21 relative to the current access process X to interrogate the cache memory 3. The request 21 comprises the current identifier $PID_c$ of the current access process, an address A(Si) of a Set Si, an index $d_r$, and a Tag $T_r$.

At steps E2-E6, and after reception of the current request 21 by the management system 1, the state machine 9 goes through the history table 7 sequentially to verify whether the current identifier $PID_c$ of the current access process X is already present in the history table 7.

At steps E2-E4, the state machine 9 compares the current identifier $PID_c$ iteratively with the identifiers PIDi stored in the history table 7.

More particularly, at step E2, for a current indexed line $L_i$ of the history table 7, the state machine 9 compares the current identifier $PID_c$ with the identifier $PID_i$ stored in that line $L_i$. If there is a match, step E6 is proceeded to, and otherwise, step E3 is proceeded to.

Step E3 is a test to verify whether the current line $L_i$ of the history table 7 is the last $L_N$ in that history table 7. If yes, step E5 is proceeded to. Otherwise, step E4 is proceeded to, in which the indexing of the line is incremented to pass to the following line $L_{j+1}$ and step E2 is looped back to.

Step E5 concerns the case in which the indexing of the current line $L_j$ verified at step E3 is the last $L_N$ of the history table 7. In other words, the end of the history table 7 is reached without finding any match between the current identifier $PID_c$ and the identifiers PID stored in the history table 7. The state machine 9 then directly triggers a cache fault (i.e. a cache miss).

It will be noted that further to the triggering of the cache fault, the processor 17 reloads the data item into the cache memory 3 from the main memory 19. Furthermore, the generator 51 generates a current random value Rc to be associated with the current identifier $PID_c$ of the current access process. The identification pair formed by the current random value Rc and the current identifier $PID_c$ is recorded in the history table 7.

At step E6, the state machine deduces that the current access process X has already written in the cache memory 3. The state machine 9 then retrieves the pair $(R_i, PID_i)$ composed of the identifier $PID_i$ and of a corresponding random value $R_i$, stored in the line $L_i$ of the history table 7, and calculates the randomized address $A_r$ indexing the cache memory 3.

Steps E7 to E10 concern the verification of the validity of the current line of the cache memory 3 defined by the corresponding randomized address $A_r$.

As a matter of fact, at step E7, the state machine 9 verifies the valid bit V of the current indexed line of the cache memory 3 defined by the randomized address $A_r$. If the bit is not valid (for example, V=0), that line L of the cache memory 3 is considered as not yet initialized and thus step E8 is proceeded to in which the state machine 9 directly triggers a cache fault (cache miss). Otherwise, step E9 is proceeded to.

Step E9 concerns the case in which the validity bit V verified at step E7 is valid (i.e. V=1). In that case, the state machine 9 verifies the tag Tr of the address tag T stored in the line L of the cache memory 3 which is indexed by the randomized address $A_r$. In case of invalidity of the tag, it is deduced that the data item sought is not the right one and step E10 is proceeded to in which the state machine 9 directly triggers a cache fault (cache miss). Otherwise, i.e. if the verification of the tag is valid, step E11 is proceeded to.

At step E11 the state machine 9 triggers a cache hit since the following three conditions are met: equality between the current identifier PIDc and an identifier PIDi stored in the table (step E2); validity of the bit V (step E7); and validity of the tag T (step E9).

Figure 4:
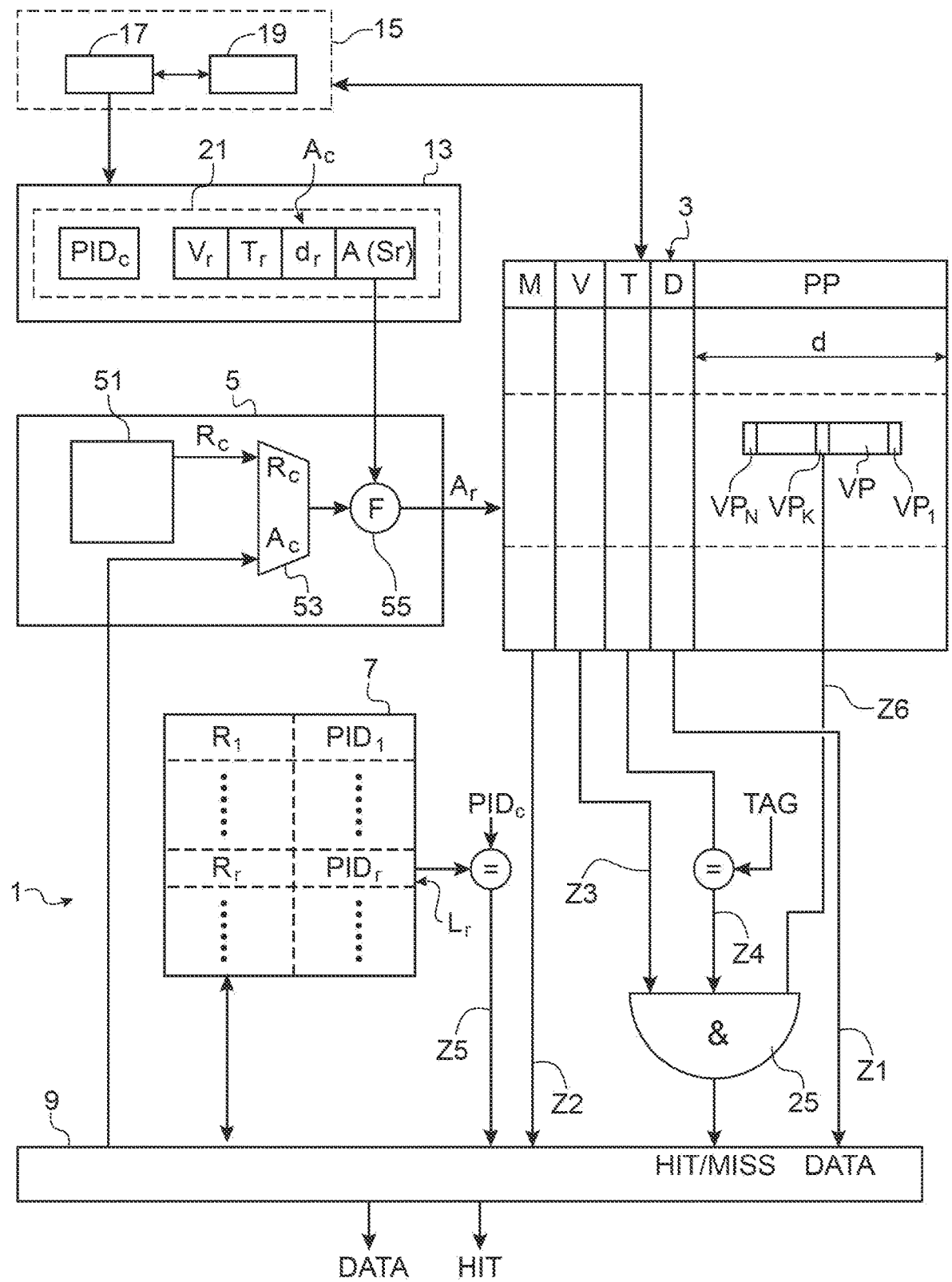
FIG. 4 is a diagram of an implementation of a system for managing a cache memory, according to a preferred embodiment of the invention.

FIG. 4 is a diagram of an implementation of a system for managing a cache memory, according to a preferred embodiment of the invention.

This management system 1 has a same constituents as that of FIG. 2 except for the fact that the cache memory 3 advantageously comprises an additional field, referred to as permission field or process PP. This permission field PP is configured to store a permission vector VP of dimension equal to the determined number N of lines of the history table 7. Each component $VP_k$ of the permission vector VP corresponds to one and only one line Lk of the history table 7 and whose value indicates legitimacy (i.e. permission) or non-legitimacy (i.e. non-permission) for the access process referenced by its identifier $PID_k$ stored in that line $L_k$. The value of a component $VP_k$ of the permission vector VP indications whether a process has a legitimate access to a data item present in the cache memory 3. If the value of the component $VP_k$ is 1 (i.e. valid), the process associated with the identifier $PID_k$ has a legitimate access to the data item but if the value of the component $VP_k$ is 0 (i.e. invalid), the process associated with the identifier $PID_k$ does not have access to the corresponding data item.

According to this embodiment, the state machine 9 goes through the lines of the history table 7 sequentially in order to calculate, at each current line, the randomized address which will index the cache memory 3. The randomized address is calculated from the random value $R_j$ stored in the current line and the address A(Sr) indicated in the request. Furthermore, the state machine 9 retrieves at each current line (i.e. each iteration j), the identification pair $(R_j, PID_j)$ composed of the random value and of the corresponding identifier $PID_j$.

The state machine 9 also verifies the validity of the current line of the cache memory 3 defined by the randomized address Ar. More particularly, the state machine 9 verifies the valid bit and the tag TAG of the line of the cache memory 3 defined by the randomized address $A_r$. When the end of the history table is reached without there being conclusive verification of the validity bit and of the tag TAG, a cache miss is declared.

On the other hand, if the validity bit and the tag TAG are valid, the state machine 9 verifies the match between the current identifier PIDc and the identifier PIDj belonging to the pair $(R_j, PID_j)$ relative to the iteration j, retrieved by the state machine 9. When there is equality (i.e. $PID_j=PID_c$), the state machine 9 verifies the validity of the component $VP_j$ of the permission vector VP. In case of validity, referenced by the arrow Z3 going directly into the state machine 9, the latter declares a cache hit and otherwise, the state machine 9 triggers a cache miss.

In case of non-match between the current identifier PIDc and the identifier PIDj, the state machine concludes that the data item indexed by the randomized address is a shared data item and in that case, verifies whether the current identifier PIDc is present in the history table. If an identifier PIDk is present in the history table equal to the current identifier PIDc, the state machine 9 notes the position k of the stored identifier $PID_k$. The state machine 9 next verifies the validity of the legitimacy bit at the position k (i.e. $VP_k$) of the permission vector VP. If yes, a cache hit is triggered enabling the processor 17 to legitimately access the data item stored in the cache memory 3 knowing that it is a data item already shared. Otherwise, the state machine 9 simulates the triggering of a cache fault (cache miss).

Thus, the logic gate 25 according to this embodiment comprises three inputs Z3, Z4, and Z6. The links Z3, Z4 are the same as those of the embodiment of FIG. 2. On the other hand, the input Z6 comes from the permission field PP. Triggering of a cache hit is carried out if the three inputs Z3, Z4, Z5 of the logic gate 25 are valid. In contrast, a cache miss is triggered if at least one of these three inputs Z3, Z4, Z6 of the logic gate 25 is invalid. In particular, if the access process accesses a data item present in the cache memory 3 but to which it does not have legitimacy, the state machine 9 triggers a cache fault, 'cache miss'. In other words, if the legitimacy bit $VP_k$ (i.e. the position k of the permission vector VP) associated with the identifier $PID_k$ is not valid, the link Z6 signals a value of non-legitimacy and, therefore, a cache fault is triggered by the state machine 9.

This makes it possible to prohibit the access tracking that an attacking process can carry out on a victim process. Furthermore, this optimizes the performance of the Furthermore 3 by enabling sharing of the same data item by several processes that are already registered in the history table 7 by their respective identifier and random values. In other words, this makes it possible not to have a same data item shared by several processes in several places of the cache memory 3.

Advantageously, if an access process requires eviction of a shared data item from the cache memory 3 or if it leaves the history table 7, the legitimacy of the process of accessing that shared data item is withdrawn without deleting it from the cache memory 3. This makes it possible to keep the shared data item in the cache memory 3 such that the other access process (or processes) sharing the same data item can still access that data item.

Furthermore, the shared data item is written back into the main memory 19 if it has been modified and a last access process having legitimacy to that shared data item evicts it from the cache memory 3 or leaves the history table 7.

Figure 5:
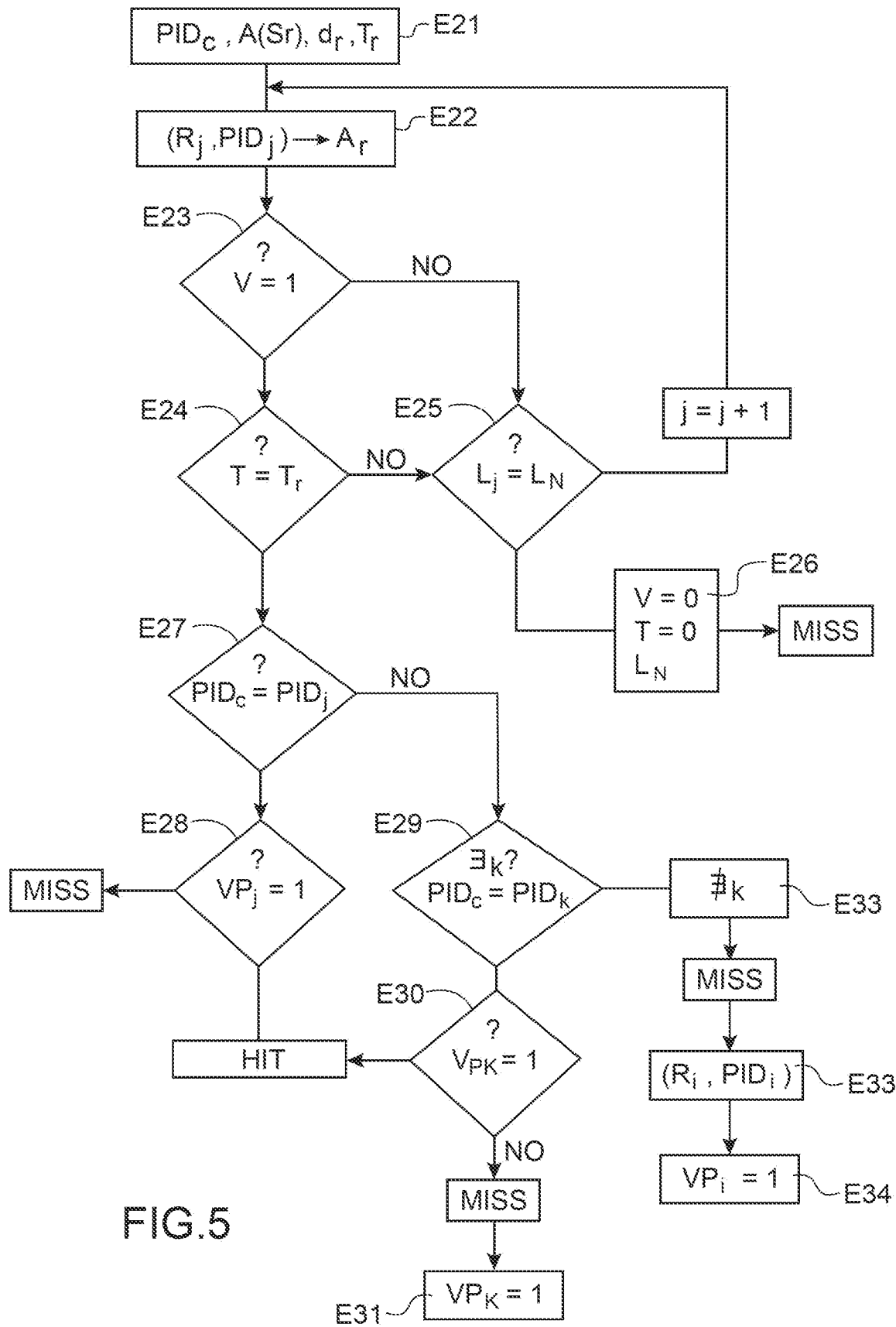
FIG. 5 is a diagram of a method for managing a cache memory, according to the system implemented in FIG. 4.

FIG. 5 is a diagram of a method of managing a cache memory, according to the system implemented in FIG. 4.

Assuming that a given current process X is executed in the processor 17 and wishes to perform an access to the main memory 19, for example to read a data item.

At step E21, the processor 17 produces a current request 21 relative to the current access process X to interrogate the cache memory 3. The request 21 comprises the current identifier $PID_c$ of the current access process, an address A(Sr) of a Set Sr, an index $d_r$, and a Tag $T_r$.

At steps E22-E25, after reception of the current request 21 by the management system 1, the state machine 9 goes through the history table 7 sequentially to calculate the randomized address which will index the cache memory 3 and at each iteration j, retrieves the identification pair ($R_i$, $PID_j$) composed of the random value $R_i$ and of the corresponding identifier $PID_j$.

More particularly, at step E22, at the iteration j (i.e. for a current indexed line $L_j$) of the history table 7, the state machine 9 retrieves the identification pair ($R_j$, $PID_j$) composed of the random value $R_i$ and of the corresponding identifier $PID_j$. Furthermore, it calculates the randomized address $A_r$ indexing the cache memory 3 based on the random value $R_j$ and the address A(Sr) indicated in the request.

At step E23, the state machine 9 verifies the valid bit V of the line of the cache memory 3 defined by the randomized address $A_r$. If this bit is not value (for example, V=0), this line L of the cache memory 3 is considered as not yet being initialized and step E25 is then proceeded to. Otherwise, step E24 is proceeded to.

Step E24 concerns the case in which the validity bit V verified at step E23 is valid (i.e. V=1). In that case, the state machine 9 verifies the tag Tr included in the request with the value of the of the tag T stored in the line L of the cache memory 3 which is indexed by the randomized address $A_r$. In case of invalidity of the tag, it is deduced that a data item sought is not the right one and step E25 is then proceeded to. Otherwise, i.e. if the verification of the tag is valid, step E27 is proceeded to.

Step E25 is a test to verify whether the current line $L_j$ of the history table 7 is the last $L_N$ in that history table 7. If yes, step E26 is proceeded to. Otherwise, the indexing of the line is incremented to pass to the following line $L_{j+1}$ and step E22 is looped back to.

Step E26 concerns the case in which the indexing of the current line $L_j$ verified at step E24 is the last $L_N$ of the history table 7. In other words, the end of the history table 7 is reached without conclusive verification of the valid bit V (step E23) or of the tag T (step E24), so the state machine 9 triggers a cache fault (i.e. a cache miss). Here, the cache fault triggers a request to the main memory to retrieve the data item which will be written in the cache memory. The generator will generate a random value which will be associated with the current identifier PIDc thus forming a new identification pair which will be recorded in the first free line of the history table 7. Let it be assumed that this free line is $L_m$, then this identification pair will be indexed ($R_m$, $PID_m$).

At step E27, the valid bit V and the tag T that were verified at steps E23 and E24 are valid, so the state machine 9 verifies the match between the current identifier PIDc and the identifier PIDj belonging to the identification pair ($R_j$, $PID_j$) relative to the indexing line Lj (i.e. iteration j), already retrieved by the state machine 9. In case of equality (i.e. $PID_j=PID_c$) this means that the data item has been loaded by that current process and thus step E28 is proceeded to. Otherwise, step E29 is proceeded to.

At step E28, the state machine 9 verifies the validity of the component $VP_j$ (i.e. at the location j) of the permission vector VP. In case of validity, the state machine 9 declares a cache hit and the processor 17 has legitimacy of access to the data item stored in the cache memory 3. Otherwise, the state machine 9 triggers a cache miss. This verification makes it possible to satisfy the concepts of memory consistency and sharing.

Step E29 concerns the case in which the current identifier PIDc is not equal to the identifier PIDj. In this case, the state machine 9 concludes the data item indexed by the randomized address is a data item shared between the current process and at least one other process. The state machine 9 then verifies whether the current identifier PIDc is present in the history table. If there is an identifier PIDk in the history table equal to the current identifier PIDc, that means that the process has already made accesses to the cache memory and step E30 is proceeded to. Otherwise, step E32 is proceeded to.

Step E30 concerns a first scenario in which the process has already made accesses to the cache memory 3. At this step the state machine 9 then notes the position k of the identifier PIDk stored in the history table 7 and returns to the line of the cache memory 3 indexed by the randomized address to verify in the permission field PP whether the legitimacy bit at the position k (i.e. $VP_k$) of the permission vector VP is valid. In the positive, a cache hit is triggered enabling the processor 17 to legitimately access the data item stored in the cache memory 3 knowing that it is a data item already shared. Otherwise, (i.e. when the legitimacy bit $VP_k$ is not valid), the state machine 9 simulates the triggering of a cache fault (cache miss) and step E31 is then proceeded to.

At step E31, the value 1 is attributed to the legitimacy bit $VP_k$ of position k to authorize the future access to that shared data item by the access process referenced by that identifier PID as if it was the one it had loaded. This makes it possible to prevent the access tracking by an attacker on a victim.

Step E32 concerns a second scenario in which the current access process makes accesses to the cache memory 3 for the first time or its accesses have already been evicted. This means that its identifier PID is not stored in the history table 7. The state machine 9 then simulates a cache fault (cache miss) even if that data item is present in the cache memory in order to prevent access tracking by an attacking process and step E33 is then proceeded to.

At step E33, the generator 51 generates a random value Rc to be associated with the current identifier $PID_c$ of that current access process. The identification pair ($R_c$, $PID_c$) composed of that random value $R_c$ and the corresponding identifier $PID_c$ is stored on the first available line (for example, the position i) in the history table 7. For example, if the first free line is $L_i$, the identification pair is referenced ($R_i$, $PID_i$). Next, step E34 is then proceeded to.

At step E34, the state machine 9 validates the legitimacy bit $VP_i$ at the position i in the permission field PP at the line of the cache memory 3 indexed by the randomized address to authorize that process to access that shared data item in the future.

The simulation of a cache miss is the fact of making the data item available to the processor in a number of cycles equivalent to a conventional miss given that the data item is already present in the cache and the current process has no legitimacy of access to that data item. For this it is possible to seek a request from the main memory and reply to the processor when the main memory has finished the task to avoid choosing a fixed number of cycles which does not reflect reality It will be noted that the present invention can apply to all cache memories. Thus, the management system according to the present invention can be implemented in any electronic device (for example a computer) comprising a processor, a main memory, and a cache memory.

The invention claimed is:

1. A method for managing a cache memory provided to equip an electronic device comprising a processor and a main memory, wherein the managing cache memory comprises the following steps:
generating a random value for each process of accessing the cache memory,
transforming addresses of the cache memory with said random value into corresponding addresses, referred to as randomized addresses being configured to index the cache memory,
associating each random value corresponding to an access process, with an identifier of said access process, forming pairs of identifications that are configured to dynamically partition the cache memory while registering the access to said cache memory,
storing each identification pair composed of a random value and of a corresponding identifier in a history table, and
managing each process of accessing the cache memory according to said identification pairs stored in said history table.

2. The method according to claim 1, further comprising the following steps:
receiving a current request comprising the current identifier of a current access process and a current access address to the cache memory,
going through the lines of the history table to verify whether an identifier is present in the history table that matches the current identifier of the current access process,
in the positive, calculating the randomized address of said current access address using the random value associated with the identifier found in the history table corresponding to the current identifier, and
in the negative, triggering a cache fault giving rise to the generation of a current random value configured to be associated with the identifier of said current access process to form a current identification pair, and
storing said current identification pair on an available line of the history table.

3. The method according to claim 1, further comprising the step of storing, in a field of the cache memory, referred to as permission field, a permission vector of dimension equal to the number of lines of the history table, each component of said permission vector corresponding to one and only one line of said history table and whose value indicates legitimacy or non-legitimacy of the access process referenced by its identifier stored in said line.

4. The method according to claim 3, further comprising the following steps:
going through the lines of the history table sequentially to calculate, at each current line, the randomized address indexing the cache memory based on the random value stored in said current line and on the address indicated in the request, and
verifying the validity of the current line of the cache memory defined by the corresponding randomized address.

5. The method according to claim 4, wherein it comprises the step of triggering a cache fault if the end of the history table is reached while validating no line of the cache memory.

6. The method according to claim 5, further comprising the following steps:
verifying the matching between the current identifier and the identifier belonging to the pair relative to the current line, if the line of the cache memory is validated,
verifying whether the current identifier is present in the history table in case of non-match between the current identifier and said identifier relative to said current line,
noting the position of an identifier stored in the history table if that identifier is equal to the current identifier,
triggering a cache hit if the legitimacy bit of the permission vector at a position corresponding to said noted position of said identifier stored in the history table, is valid,
simulating the triggering of a cache fault if the legitimacy bit at said position of the permission vector is not valid.

7. The method according to claim 6, wherein if a cache fault is triggered, said method comprises the step of withdrawing the legitimacy of a process of accessing a shared data item, without deleting said shared data item from the cache memory if said access process requires eviction of said shared data item from the cache memory or if it leaves the history table.

8. The method according to claim 6, further comprising the step of writing back said shared data item in the main memory if it has been modified and a last access process having legitimacy to said shared data item evicts it from the cache memory or leaves the history table.

9. A system for managing a cache memory configured to equip an electronic device comprising a processor and a main memory, wherein said system comprises:
a randomization module configured to generate a random value for each process of accessing the cache memory, and configured to transform addresses of the cache memory with said random value into corresponding addresses, referred to as randomized addresses configured to index the cache memory,
a history table composed of a determined number of lines configured to store therein on each line an identification pair associating a random value corresponding to an access process, with an identifier of said corresponding access process, forming identification pairs that are configured to dynamically partition the cache memory while registering the access to said cache memory, and a state machine configured to access the history table and to manage each process of accessing the cache memory according to said identification pairs stored in said history table.

10. The system according to claim 9, further comprising:

a set of registers configured to receive a current request comprising the current identifier of a current access process and a current access address to the cache memory, and a state machine configured to:

go through the lines of the history table to verify whether an identifier is present in the history table that matches the current identifier of the current access process, in the positive, calculate the randomized address of said current access address using the random value associated with the identifier found in the history table corresponding to the current identifier, and in the negative, trigger a cache fault giving rise to the generation of a current random value configured to be associated with the identifier of said current access process to form a current identification pair, and store said current identification pair on an available line of the history table.

11. The system according to claim 10, wherein the cache memory is subdivided into several lines each of which comprises a permission field of the access process configured to store therein a permission vector of dimension equal to the number of lines of the history table, each component of said permission vector corresponding to one and only one line of said history table and whose value indicates legitimacy or non-legitimacy of the access process referenced by its identifier stored in said line.

12. The system according to claim 11, wherein the state machine is configured to:

go through the lines of the history table sequentially to calculate, at each current line, the randomized address indexing the cache memory based on the random value stored in said current line and on the address indicated in the request, and verify the validity of the current line of the cache memory defined by the corresponding randomized address.

13. The system according to claim 12, wherein the state machine is configured to:

verify the matching between the current identifier and the identifier belonging to the pair relative to the current line, if the line of the cache memory is validated, verify whether the current identifier is present in the history table in case of non-match between the current identifier and said identifier relative to said current line, note the position of an identifier stored in the history table if that identifier is equal to the current identifier, trigger a cache hit if the legitimacy bit of the permission vector at a position corresponding to said noted position of said identifier stored in the history table, is valid, simulate the triggering of a cache fault if the legitimacy bit at said position of the permission vector is not valid.

14. An electronic device comprising a processor, a main memory, and a cache memory further comprising a management system configured to manage the cache memory according to claim 9.

\* \* \* \* \*